United States Patent Office 3,007,964
Patented Nov. 7, 1961

3,007,964
METHOD OF PREPARING SALTS OF 2,2-DICHLOROPROPIONIC ACID
Asa O. Maylott and Robert H. Meyer, Concord, Calif., assignors to The Dow Chemical Company, Midland, Mich., a corporation of Delaware
No Drawing. Filed Dec. 1, 1958, Ser. No. 777,215
4 Claims. (Cl. 260—539)

The present invention relates to salts of 2,2-dichloropropionic acid and is directed to an improved method of preparing alkali metal salts of 2,2-dichloropropionic acid. The term alkali metal as used in the present specification and claims is inclusive of the ammonium ion.

Alkali metal salts of 2,2-dichloropropionic acid are well known and widely used as selective herbicides. They have found application in the control of grass weeds. However, commercial production of these salts has been handicapped by the fact that neutralization of 2,2-dichloropropionic acid, when carried out in water, is accompanied by decomposition in greater or less degree of the 2,2-dichloroproprionic acid moiety. For example, when the 2,2-dichloroproprionic acid is neutralized with an alkali material, such as sodium hydroxide, in water at or near the boiling temperature under standard conditions, the acid and the resulting salts are unstable and break down or decompose more or less promptly with the formation or herbicidally useless or nearly useless degradation products. When the same procedure is carried out at lower temperatures the breakdown of the acid and salts proceeds at a lower rate of speed. However, in any case the neutralization in water results in the formation of a water solution of at least the products of such neutralization, and all common and commercially economical means for removing such water to obtain a dry product cause breakdown of the desired product to a greater or less extent.

It is known to carry out neutralizations in the absence of water. In the present instance, 2,2-dichloropropionic acid is, under normal conditions, a liquid, and the neutralizing material such as, for example, sodium or potassium hydroxide, carbonate, or bicarbonate, may be added directly to the acid. However, the resulting salts are somewhat soluble in the unneutralized parent acid with the result that completion of such neutralization and separation of the resulting salt is impractical without resort to uneconomic means such as solvent washing.

The reaction may be carried out in an alkanol which may be ethanol, methanol, propanol or isopropanol, or other alkanol solvent for the acid. However, the resulting salt is substantially soluble in such alkanols with the result that separation and purification are difficult, and product losses are relatively great.

The reaction may be carried out in a hydrocarbon such as petroleum ether, benzene, or the like. Repeated efforts to carry out the neutralization in such medium have failed to carry the reaction past 75 percent of completion for reasons not fully understood. No reasonable excess of neutralizing agent, time, or application of heat and other similar means known in the art has carried the neutralization to completion in such solvent.

Accordingly, it is an object of the present invention to provide a means to neutralize 2,2-dichloropropionic acid in the absence of aqueous medium. It is a further object of the present invention to provide means for the economical preparation of an alkali metal salt of 2,2-dichloropropionic acid. These and other objects will be made more clearly understandable by the specification which follows:

According to the present invention, alkali salts of 2,2-dichloropropionic acid are prepared by carrying out the procedural steps of contacting 2,2-dichloropropionic acid with an essentially dry alkali compound of an alkali metal in a liquid chlorinated hydrocarbon as reaction medium, and thereafter separating in its solid phase an alkali salt of 2,2-dichloropropionic acid.

In practicing this invention there is provided a vessel containing a chlorinated hydrocarbon solvent such as perchloroethylene, methylene dichloride, 1,1,1-trichloroethane, 1,1,2,2-tetrachloroethane, 1,1,1,2-tetrachloroethane, chloroform, carbon tetrachloride, ethyl chloride, ethylene dichloride, propyl chloride, 1,2-dichloropropane, 1,3-dichloropropane, monochlorobenzene, chlorohexane, and the like. The degree of chlorination, that is to say the ratio of the number of chlorine atoms to the molecular weight of such chlorinated hydrocarbon solvent is immaterial provided only that the solvent be liquid under normal conditions. If desired, a mixture of such solvents may be employed. Of the reactants, either the 2,2-dichloropropionic acid or an alkaline compound is dispersed in the solvent, preferably with stirring. To the resulting dispersion is added about a stoichiometric amount of the other of the two reactants. The rate of combining of the reactants is regulated for convenience in release of heat and by-products of reaction. For example, when an alkali metal carbonate is employed as a reactant, carbon dioxide is evolved in relatively large volume, and combining of reactants may be carried out at a rate such that venting of such gas may be carried out conveniently. Upon completion of the addition, stirring is continued with sufficient vigor to maintain any insoluble material present in the form of a slurry, and the resulting reaction mixture is heated, if necessary, to carry the reaction to completion. Upon completion of the neutralization, stirring is discontinued, whereupon the desided alkali salt of 2,2-dichloropropionic acid precipitates in the reaction solvent. Further such salt may precipitate as the reaction mixture cools: at or below normal room temperature the said salt precipitates approximately quantitatively. The mixture is filtered to recover the desired salt which may be moist from chlorinated hydrocarbon reaction medium and from water of reaction, and may thereafter be further dried to any desired degree in conventional methods such as by gentle heating under atmospheric or subatmospheric pressure, in moving or still air or other inert gas. It has been found convenient to provide chlorinated hydrocarbon solvent according to the present invention in the amount of approximately 1 liter per each two or three and one half gram moles of salt product. The resulting slurries are easily handled in pumps, pipes, and other industrial production facilities. However, the precise amount of solvent to be employed is not critical.

An anhydrous alkali metal carbonate is a preferred reactant in the present invention because two moles of 2,2-dichloropropionic acid may be neutralized per mole thereof, with the evolution of but one mole of water of reaction and this is advantageous in the ultimate preparation of a dry product. However, hydroxides or bicarbonates of alkali metals may be employed in practicing the present invention.

Similarly, ammonia may be employed in the present reaction with the direct production of an essentially water-free product.

The following examples illustrate the invention but are not to be construed as limiting.

*Example 1.—In perchloroethylene*

Sodium carbonate (780 grams; 7.5 gram moles) was slurried in 5 liters of perchloroethylene and heated to 50° C. To the slurry were added 15 gram moles (2,150 grams) of 2,2-dichloropropionic acid. The resulting mixture was stirred during the addition, which required 20 minutes. Stirring was thereafter continued and the resulting reaction mixture heated over a period of 1 hour to a maximum temperature of 90° C. while a product precipitate formed. Thereafter, the mixture was cooled and the product precipitate which appeared in the mixture was removed by filtration. The residue from such filtration was found upon analysis to consist essentially of sodium 2,2-dichloropropionate; and the solvent filtrate contained 0.26 percent of the starting acid in unreacted form. The said product precipitate was then oven dried, to obtain a sodium 2,2-dichloropropionate product in apparently dry form.

Example 2

Finely powdered anhydrous sodium carbonate (219 pounds; 2.07 pound moles) was slurried in 1 kiloliter of perchloroethylene at room temperature. To this slurry was added 519 pounds (4.13 pound moles) of 2,2-dichloropropionic acid, the rate of addition being regulated to limit the rate of evolution of carbon dioxide to a volume which the equipment could vent satisfactorily, and to avoid excessively violent effervescence and to avoid excessive ebullition of the reaction medium from heat of reaction. Upon completion of the addition, stirring was continued and the resulting reaction mixture was heated to 70° C. and maintained thereat for 2 hours to carry the reaction to completion. The reaction mixture was then cooled to 50° C. and filtered. The residue was a finely crystalline nearly dry sodium 2,2-dichloropropionate product, from which residual moisture was thereafter evaporated. A sample of the resulting dry product was analyzed, and was found to contain 0.20 percent sodium carbonate, 2.08 percent sodium chloride, 1.48 percent water and 91.0 percent sodium 2,2-dichloropropionate.

Example 3.—In monochlorobenzene 2,2-dichloropropionic acid (143 grams; 1 gram-mole) was added dropwise to 53 grams (0.5 gram mole) sodium carbonate slurried in 285 milliliters monochlorobenzene. The resulting reaction mixture was heated at 70° C. for 3.5 hours. The sodium 2,2-dichloropropionate product was removed by filtration. The neutralization and the recovery of resulting salt were each more than 99 percent complete.

Example 4.—In chloroform

One gram mole 2,2-dichloropropionic acid was added slowly to a slurry of one half gram mole sodium carbonate in 350 milliliters chloroform and the resulting reaction mixture heated at 45° for 130 minutes. As a result of this process, more than 99 percent of the acid was converted to, and recovered by filtration from solvent as sodium salt.

Example 5.—In methylene dichloride

Sodium carbonate (13.25 grams; 0.125 mole) was slurried in 91 milliliters methylene dichloride and 0.25 gram-mole (35.75 grams) 2,2-dichloropropionic acid was added. The resulting reaction mixture was slowly heated to the boiling point (41° C.) for 95 minutes and thereafter allowed to stand in room temperatures for 8 hours. As a result of this procedure, more than 99.8 percent of the acid was neutralized, and was thereafter recovered as sodium salt by filtration.

Example 6.—In carbon tetrachloride

Sodium carbonate (0.5 gram mole; 53 grams) was slurried in 330 milliliters carbon tetrachloride and to the slurry were added 143 grams (1 gram mole) 2,2-dichloropropionic acid. The resulting reaction mixture was heated to the boiling point (77° C.) and maintained thereat for 1.1 hours, during which period a product precipitate formed. This precipitate was subsequently recovered and dried, and found upon analysis to represent more than 99 percent of the acid reactant.

Example 7.—In perchloroethylene

Ammonia (one gram-mole: 17 grams) is bubbled into a solution of one gram-mole (143 grams) of 2,2-dichloropropionic acid in 500 milliliters perchloroethylene, slowly and with stirring. Heat of reaction raises the reaction mixture temperature but it is kept below the boiling point of solvent by regulating the rate at which ammonia is added. During the reaction, an ammonium salt product of 2,2-dichloropropionic acid is formed and settles as a precipitate in the reaction mixture, from which it is thereafter removed by centrifugation. Perchloroethylene reaction medium adhering to the product is vaporized and removed, and a dry ammonium salt product of 2,2-dichloropropionic acid is obtained.

In manner similar to the foregoing examples, the process of the present invention is carried out with the use of alkali materials containing anions of other elements including, for example, potassium hydroxide, potassium carbonate, potassium bicarbonate, lithium hydroxide, lithium carbonate, lithium bicarbonate, rubidium hydroxide, rubidium carbonate, rubidium bicarbonate, ammonium carbonate, cesium hydroxide, cesium carbonate, and cesium bicarbonate.

In each of the foregoing examples, the salt of 2,2-dichloropropionic acid is practically insoluble in the reaction mixture and can be readily recovered by filtration, decantation, centrifugation or the like.

Various modifications of the process and products of the present invention may be made without departing from the spirit or scope thereof, and it is to be understood that we limit ourselves only as defined in the appended claims.

We claim:

1. In a method of preparing a salt of 2,2-dichloropropionic acid, the procedural steps of contacting, in a liquid chlorinated hydrocarbon as reaction medium, 2,2-dichloropropionic acid and an essentially anhydrous compound which is a member of the group consisting of ammonia and the alkali metal hydroxides, carbonates, and bicarbonates, and thereafter separating in its solid phase the salt of 2,2-dichloropropionic acid.

2. In a method of preparing substantially dry alkali metal salts of 2,2-dichloropropionic acid, the procedural steps of contacting 2,2-dichloropropionic acid with an essentially dry, finely subdivided alkali metal carbonate in liquid chlorinated hydrocarbon as reaction medium, and thereafter separating the desired alkali metal salt in its solid phase.

3. In a method of preparing the substantially dry sodium salt of 2,2-dichloropropionic acid, the steps of contacting 2,2-dichloropropionic acid with essentially dry, finely subdivided anhydrous sodium carbonate in a liquid chlorinated hydrocarbon as reaction medium, and thereafter separating the desired sodium salt in a solid phase.

4. In a method of preparing the substantially dry ammonium salt of 2,2-dichloropropionic acid, the step which consists of contacting 2,2-dichloropropionic acid with gasous ammonia in a liquid chlorinated hydrocarbon as reaction medium, and thereafter separating the desired ammonium salt in its solid phase.

References Cited in the file of this patent

UNITED STATES PATENTS

| 2,446,233 | Lamborn | Aug. 3, 1948 |
| 2,642,354 | Barrons | June 16, 1953 |

FOREIGN PATENTS

| 871,890 | Germany | Mar. 26, 1953 |